United States Patent
Nishidate et al.

(10) Patent No.: US 10,429,925 B2
(45) Date of Patent: Oct. 1, 2019

(54) HEAD-MOUNTED DISPLAY, INFORMATION PROCESSING DEVICE, DISPLAY CONTROL METHOD, AND PROGRAM

(71) Applicant: Sony Interactive Entertainment Inc., Tokyo (JP)

(72) Inventors: Masaomi Nishidate, Tokyo (JP); Ryuichi Okayama, Sapporo (JP); Keisuke Ai, Sapporo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 73 days.

(21) Appl. No.: 15/157,806

(22) Filed: May 18, 2016

(65) Prior Publication Data
US 2016/0357017 A1    Dec. 8, 2016

(30) Foreign Application Priority Data

Jun. 2, 2015    (JP) ................ 2015-112591

(51) Int. Cl.
| | | |
|---|---|---|
| *G06F 3/01* | (2006.01) | |
| *G02B 27/01* | (2006.01) | |
| *G02B 27/00* | (2006.01) | |

(52) U.S. Cl.
CPC ......... *G06F 3/013* (2013.01); *G02B 27/0093* (2013.01); *G02B 27/017* (2013.01); *G06F 3/012* (2013.01); *G02B 2027/014* (2013.01)

(58) Field of Classification Search
CPC ..... G06F 3/013; G06F 3/012; G02B 27/0093; G02B 27/017; G02B 2027/014
See application file for complete search history.

(56) References Cited

U.S. PATENT DOCUMENTS

| | | | | |
|---|---|---|---|---|
| 5,613,048 A | * | 3/1997 | Chen et al. ............... | 395/119 |
| 9,589,384 B1 | * | 3/2017 | Waggoner ............. | G06F 3/012 |
| 2002/0057438 A1 | * | 5/2002 | Decker ............ | G01B 11/2509 |
| | | | | 356/601 |
| 2011/0164029 A1 | * | 7/2011 | King ................... | G06F 3/04883 |
| | | | | 345/419 |

(Continued)

FOREIGN PATENT DOCUMENTS

| | | |
|---|---|---|
| JP | 11-153987 A | 6/1999 |
| JP | 2002-163103 | 6/2002 |
| JP | 2004-246712 A | 9/2004 |

(Continued)

OTHER PUBLICATIONS

Japanese Office Action dated Jan. 17, 2017 for the Corresponding Japanese Patent Application No. 2015-112591.

*Primary Examiner* — Jonathan A Boyd
(74) *Attorney, Agent, or Firm* — Katten Muchin Rosenman LLP

(57) ABSTRACT

A head-mounted display that displays an image representing appearance obtained when an object is viewed from a point of view disposed in a virtual three-dimensional space, includes a detecting section that detects rotation of the head-mounted display and a display control section that carries out control to cause displaying of an image representing appearance obtained when the object is viewed from the point of view that has relatively revolved in the direction of the detected rotation while the position of a point of gaze is kept in response to the detection of the rotation by the detecting section.

4 Claims, 11 Drawing Sheets

(56) References Cited

U.S. PATENT DOCUMENTS

2014/0354515 A1* 12/2014 LaValle ............... G02B 27/017
    345/8
2016/0071320 A1* 3/2016 Smith .................. G06T 19/006
    345/633

FOREIGN PATENT DOCUMENTS

| JP | 2013-029958 A | 2/2013 |
| JP | 2014-137646 A | 7/2014 |
| WO | 2014/194135 A1 | 12/2014 |

* cited by examiner

HEAD-MOUNTED DISPLAY, INFORMATION PROCESSING DEVICE, DISPLAY CONTROL METHOD, AND PROGRAM

BACKGROUND

The present disclosure relates to a head-mounted display, an information processing device, a display control method, and a program.

Portable game systems and game devices that include an acceleration sensor and so forth and can change displayed contents through change in the posture are known (refer to Japanese Patent Laid-open Nos. 2003-334379, 2003-325974, 2006-68027, and 2006-110382, which are hereinafter referred to as Patent Documents 1, 2, 3, and 4, respectively). In a technique described in Patent Documents 1 and 2, the basic coordinates of the point of view are rotated in the opposite direction to a tilt direction detected by a tilt sensor, and therefore, a player can be given a feeling as if a three-dimensional game space were tilted in association with the tilt of a game device or the like.

Furthermore, a head-mounted display (HMD) is known that is mounted at a head by a user and allows the user to achieve visual sensing and so forth of an image representing appearance obtained when an object is viewed from a point of view disposed in a virtual three-dimensional space. Among such HMDs is one in which the position and the direction of the line of sight of the point of view disposed in the virtual three-dimensional space change in association with change in the posture of the head of the user. For example, when the user moves the head without rotating the head, the position of the point of view moves in the direction in which the head is moved while the direction of the line of sight of the point of view disposed in the virtual three-dimensional space is kept. Furthermore, for example, when the user rotates the head without changing the position of the head, the direction of the line of sight is rotated in the direction in which the head is rotated while the position of the point of view disposed in the virtual three-dimensional space is kept.

SUMMARY

In the case of the related-art HMD, to visually sense, from various angles, an object that appears to be disposed on the front side as viewed from the user in the virtual three-dimensional space, the user makes the head revolve to various positions around the position in the real space corresponding to the position of this object. For example, to visually sense this object from the opposite side, the user goes around to the back side of the position in the real space corresponding to the position of this object. As just described, in the case of the related-art HMD, it is difficult to say that the burden on the user is small when the user visually senses, from various angles, the object that appears to be disposed on the front side as viewed from the user and is disposed in the virtual three-dimensional space.

Possibly the technique described in Patent Documents 1 and 2 will be applied to a situation in which a display unit is disposed in front of the eyes of a user irrespective of the posture of the head, such as a situation in which an HMD is mounted for example. However, in this technique, the basic coordinates of the point of view are rotated in the opposite direction to a tilt direction detected by the tilt sensor as described above. Therefore, the user feels a sense of discomfort when this technique is applied to the situation in which a display unit is disposed in front of the eyes of the user irrespective of the posture of the head.

It is desirable to alleviate the burden on a user when the user visually senses, from various angles, an object that appears to be disposed on the front side as viewed from the user in a virtual three-dimensional space.

According to an embodiment of the present disclosure, there is provided a head-mounted display that displays an image representing appearance obtained when an object is viewed from a point of view disposed in a virtual three-dimensional space. The head-mounted display includes a detecting section configured to detect rotation of the head-mounted display and a display control section configured to carry out control to cause displaying of an image representing appearance obtained when the object is viewed from the point of view that has relatively revolved in the direction of the detected rotation while the position of a point of gaze is kept in response to the detection of the rotation by the detecting section.

According to another embodiment of the present disclosure, there is provided an information processing device that displays an image representing appearance obtained when an object is viewed from a point of view disposed in a virtual three-dimensional space. The information processing device includes a display control section configured to carry out control to cause displaying of an image representing appearance obtained when the object is viewed from the point of view that has relatively revolved in the direction of detected rotation while the position of a point of gaze is kept in response to detection of the rotation.

According to another embodiment of the present disclosure, there is provided a display control method for displaying an image representing appearance obtained when an object disposed in a virtual three-dimensional space is viewed from a point of view disposed in the virtual three-dimensional space. The display control method includes detecting rotation and carrying out control to cause displaying of an image representing appearance obtained when the object is viewed from the point of view that has relatively revolved in the direction of the detected rotation while the position of a point of gaze is kept in response to the detection of the rotation.

According to another embodiment of the present disclosure, there is provided a program for a computer which displays an image representing appearance obtained when an object disposed in a virtual three-dimensional space is viewed from a point of view disposed in the virtual three-dimensional space. The program includes, by a detecting section, detecting rotation; and by a display control section, carrying out control to cause displaying of an image representing appearance obtained when the object is viewed from the point of view that has relatively revolved in the direction of the detected rotation while the position of a point of gaze is kept in response to the detection of the rotation.

DETAILED DESCRIPTION OF THE PREFERRED EMBODIMENT

One embodiment of the present disclosure will be described below with reference to the drawings.

Figure 1:
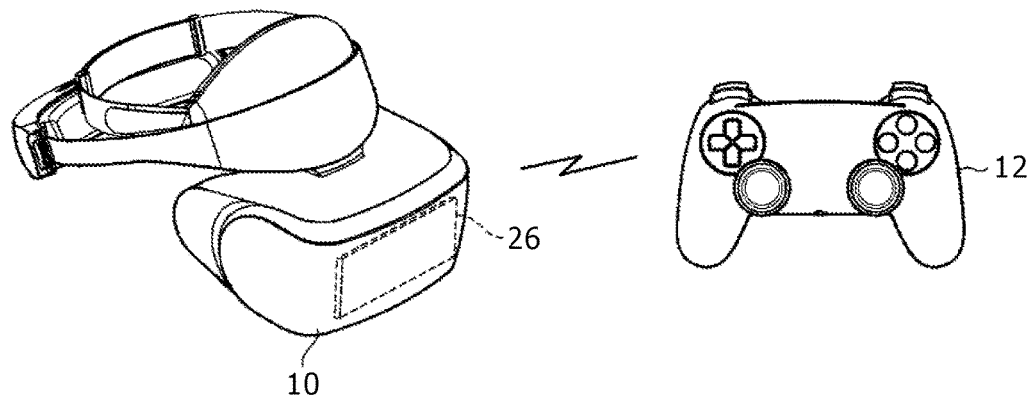
FIG. 1 is a diagram showing one example of the overall configuration of one embodiment of the present disclosure.
Figure 2:
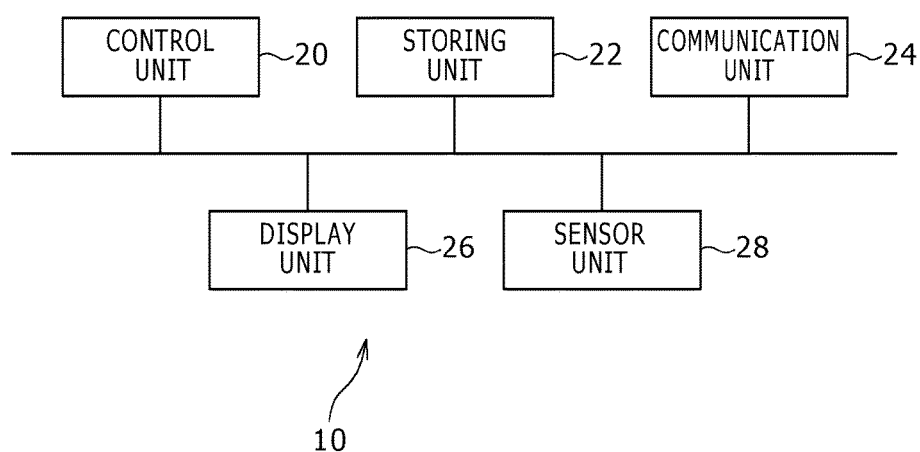
FIG. 2 is a diagram showing one example of the configuration of a head-mounted display according to one embodiment of the present disclosure.

FIG. 1 is a diagram showing one example of the overall configuration of one embodiment of the present disclosure. FIG. 2 is a diagram showing one example of the configuration of a head-mounted display (HMD) 10 according to the present embodiment. As shown in FIG. 1, the HMD 10 can communicate with a controller 12 in the present embodiment. Then, a user of the HMD 10 can carry out various kinds of operation to the HMD 10 by operating the controller 12.

As shown in FIG. 2, a control unit 20, a storing unit 22, a communication unit 24, a display unit 26, and a sensor unit 28 are included in the HMD 10 according to the present embodiment for example.

The control unit 20 is a program control device such as a central processing unit (CPU) that operates in accordance with a program stored in the storing unit 22 for example.

The storing unit 22 is e.g. a memory element such as a read only memory (ROM) or a random access memory (RAM). In the storing unit 22, programs to be executed by the control unit 20 and so forth are stored.

The communication unit 24 is e.g. a communication interface such as a wireless local area network (LAN) port. The communication unit 24 according to the present embodiment receives an operation signal transmitted from the controller 12 for example.

The display unit 26 is e.g. a display such as a liquid crystal display or an organic electro-luminescence (EL) display and displays images, video, and so forth. In the present embodiment, the display unit 26 is disposed in front of the eyes of a user who wears the HMD 10 as shown in FIG. 1. The display unit 26 according to the present embodiment may be capable of displaying three-dimensional video.

The sensor unit 28 is e.g. a sensor such as an acceleration sensor, a gyro sensor, a geomagnetic sensor, or a barometric sensor and measures the posture, the amount of rotation, the amount of movement, and so forth of the HMD 10.

The sensor unit 28 according to the present embodiment outputs the measurement results such as the posture, the amount of rotation, and the amount of movement of the HMD 10 to the control unit 20 at a predetermined frame rate (e.g. interval of 1/60 seconds). On the basis of these measurement results, the control unit 20 identifies the amount of movement and the amount of rotation of the HMD 10 per unit time, i.e. the speed and the angular velocity of the HMD 10. In this manner, the amount of movement and the amount of rotation of the HMD 10 can be identified at the predetermined frame rate in the present embodiment. Furthermore, in the present embodiment, on the basis of the amount of movement and the amount of rotation that are identified, the position and the direction of the line of sight of a point 30 of view in a virtual three-dimensional space change at the predetermined frame rate as described below.

Figure 3:
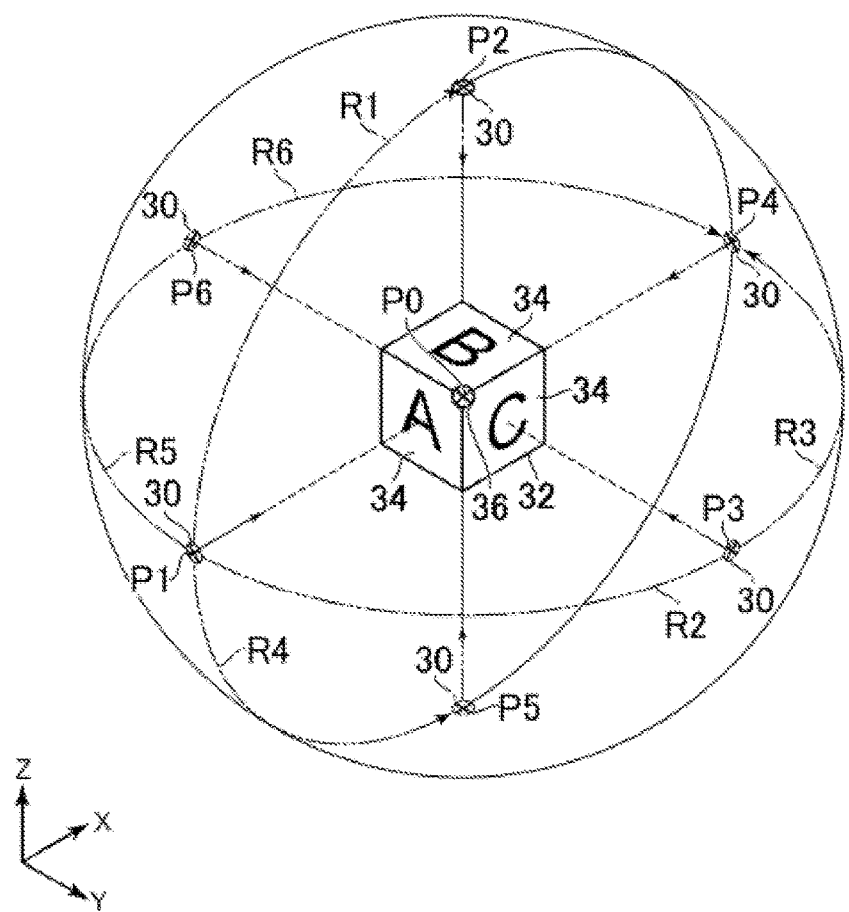
FIG. 3 is a diagram showing one example of a virtual three-dimensional space.

The display unit 26 of the HMD 10 according to the present embodiment displays an image representing appearance obtained when an object disposed in a virtual three-dimensional space exemplified in FIG. 3 is viewed from the point 30 of view disposed in this virtual three-dimensional space. In the virtual three-dimensional space exemplified in FIG. 3, a menu object 32 that is a hexahedron is disposed as one example of such an object. On each surface of the menu object 32 according to the present embodiment, an option 34 for which any alphabet among "A" to "F" is indicated is disposed. Here, for example, suppose that the option 34 of "A" is disposed on the front surface of the menu object 32 and the option 34 of "B" and the option 34 of "C" are disposed on the upper surface and the right side surface, respectively. Furthermore, suppose that the option 34 of "D" is disposed on the back surface of the menu object 32 and the option 34 of "E" and the option 34 of "F" are disposed on the lower surface and the left side surface, respectively, although these options 34 are not clearly shown in FIG. 3.

In the present embodiment, for example, in the initial state, the point 30 of view is disposed at a position P1 in the virtual three-dimensional space, with the direction of the line of sight oriented toward the option 34 of "A," as shown in FIG. 3. Therefore, in the present embodiment, the option 34 of "A" is displayed on the display unit 26 in the initial state for example.

Furthermore, in the present embodiment, a point 36 of gaze is set at the center of the menu object 32 as shown in FIG. 3 in the initial state for example. Moreover, the direction of the line of sight of the point 30 of view passes through the point 36 of gaze in the initial state. Here, suppose that the point 36 of gaze is set at a position P0 for example.

In the virtual three-dimensional space shown in FIG. 3, the direction of the line of sight in the initial state is defined as the X-axis positive direction. Furthermore, the right direction as viewed from the point 30 of view in the initial state is defined as the Y-axis positive direction and the upper direction as viewed from the point 30 of view in the initial state is defined as the Z-axis positive direction.

In the present embodiment, a user who wears the HMD 10 can change the displayed option 34 by rotating the head. Furthermore, in the present embodiment, in response to selection operation by the user, processing according to the option 34 being displayed when the selection operation is carried out, specifically e.g. initiation of a game program associated with the option 34 being displayed, displaying of a setting screen, or the like, is executed.

In the present embodiment, when the user who wears the HMD 10 rotates the head, the point 30 of view relatively revolves in the direction of the rotation. Furthermore, in the present embodiment, the position of the point 36 of gaze and the distance from the point 30 of view to the menu object 32 are kept when the point 30 of view revolves.

Figure 4:
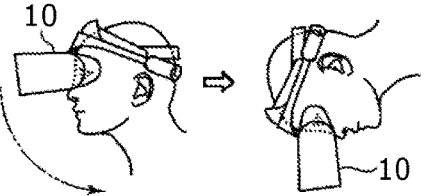
FIG. 4 is a diagram showing one example of the relationship between the rotation of the head and change in displayed contents.

Here, suppose that the user rotates the head to orient the face toward the lower side as shown in column A of (1) of FIG. 4 when the point 30 of view is disposed at the position P1. In this case, the point 30 of view revolves to a position P2 along a route R1 so that the direction of the line of sight may be oriented toward the lower side as shown in FIG. 3. Here, for example, the point 30 of view revolves on the XZ plane by 90 degrees clockwise as viewed from the right side of the virtual three-dimensional space in FIG. 3, i.e. as viewed along the Y-axis negative direction. Thereupon, as shown in column B of (1) of FIG. 4, the option 34 displayed on the display unit 26 changes from "A" to "B."

Suppose that the user rotates the head to orient the face toward the left side as shown in column A of (2) of FIG. 4 when the point 30 of view is disposed at the position P1. In this case, the point 30 of view revolves to a position P3 along a route R2 so that the direction of the line of sight may be oriented toward the left side as shown in FIG. 3. Here, for example, the point 30 of view revolves on the XY plane by 90 degrees anticlockwise as viewed from the upper side of the virtual three-dimensional space in FIG. 3, i.e. as viewed along the Z-axis negative direction. Thereupon, as shown in column B of (2) of FIG. 4, the option 34 displayed on the display unit 26 changes from "A" to "C."

Suppose that the user rotates the head anticlockwise as viewed from above to orient the face toward the back side as shown in column A of (3) of FIG. 4 when the point 30 of view is disposed at the position P1. In this case, the point 30 of view revolves to a position P4 along the route R2 and a route R3 so that the direction of the line of sight may be oriented toward the back side as shown in FIG. 3. Here, for example, the point 30 of view revolves on the XY plane by 180 degrees anticlockwise as viewed from the upper side of the virtual three-dimensional space in FIG. 3, i.e. as viewed along the Z-axis negative direction. Thereupon, as shown in column B of (3) of FIG. 4, the option 34 displayed on the display unit 26 changes from "A" to "D."

Suppose that the user rotates the head to orient the face toward the upper side as shown in column A of (4) of FIG. 4 when the point 30 of view is disposed at the position P1. In this case, the point 30 of view revolves to a position P5 along a route R4 so that the direction of the line of sight may be oriented toward the upper side as shown in FIG. 3. Here, for example, the point 30 of view revolves on the XZ plane by 90 degrees anticlockwise as viewed from the right side of the virtual three-dimensional space in FIG. 3, i.e. as viewed along the Y-axis negative direction. Thereupon, as shown in column B of (4) of FIG. 4, the option 34 displayed on the display unit 26 changes from "A" to "E."

Suppose that the user rotates the head to orient the face toward the right side as shown in column A of (5) of FIG. 4 when the point 30 of view is disposed at the position P1. In this case, the point 30 of view revolves to a position P6 along a route R5 so that the direction of the line of sight may be oriented toward the right side as shown in FIG. 3. Here, for example, the point 30 of view revolves on the XY plane by 90 degrees clockwise as viewed from the upper side of the virtual three-dimensional space in FIG. 3, i.e. as viewed along the Z-axis negative direction. Thereupon, as shown in column B of (5) of FIG. 4, the option 34 displayed on the display unit 26 changes from "A" to "F."

Suppose that the user rotates the head clockwise as viewed from above to orient the face toward the back side as shown in column A of (6) of FIG. 4 when the point 30 of view is disposed at the position P1. In this case, the point 30 of view revolves to the position P4 along the route R5 and a route R6 so that the direction of the line of sight may be oriented toward the back side as shown in FIG. 3. Here, for example, the point 30 of view revolves on the XY plane by 180 degrees clockwise as viewed from the upper side of the virtual three-dimensional space in FIG. 3, i.e. as viewed along the Z-axis negative direction. Thereupon, as shown in column B of (6) of FIG. 4, the option 34 displayed on the display unit 26 changes from "A" to "D."

As described above, in the present embodiment, according to the rotation of the head of the user who wears the HMD 10, the point of view relatively revolves in the direction of the rotation of the head of the user, with the position of the point 36 of gaze kept. Therefore, the user can effortlessly visually sense, from every angle, the object that appears to be disposed on the front side as viewed from the user and is disposed in the virtual three-dimensional space. In this manner, according to the present embodiment, the burden on the user when the user visually senses the object that appears to be disposed on the front side as viewed from the user and is disposed in the virtual three-dimensional space is alleviated.

Furthermore, the operation of the HMD 10 according to the present embodiment is obviously different from the operation of the HMD according to the related-art virtual reality (VR) technique in which the position and the direction of the line of sight of a point of view disposed in a virtual three-dimensional space change in association with change in the posture of the head of the user. Nevertheless, change in displaying in the HMD 10 according to the present embodiment when the head is made to revolve around the position in the real space corresponding to the position of the menu object 32 is similar to change in displaying in the HMD according to the related-art VR technique. Therefore, even a user who is accustomed to the HMD according to the related-art VR technique can use the HMD 10 according to the present embodiment without a sense of discomfort.

In the present embodiment, when the point 30 of view revolves, not only the position of the point 36 of gaze but also the distance from the point 30 of view to the menu object 32 is also kept. Therefore, the user can visually sense the menu object 32 more effortlessly than in the case in which the distance from the point 30 of view to the menu object 32 is not kept.

Figure 5:
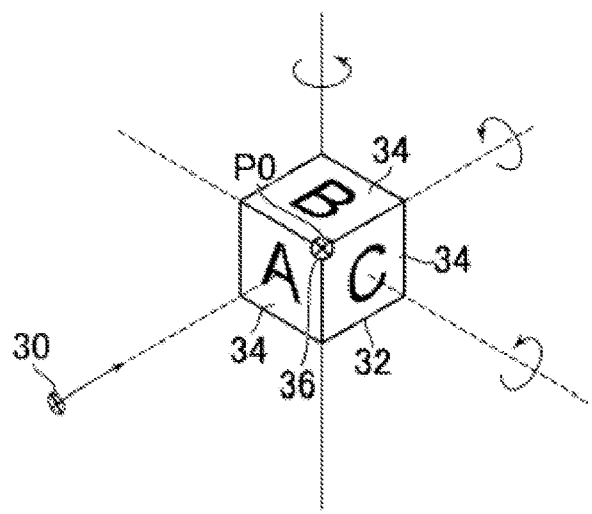
FIG. 5 is a diagram showing one example of the virtual three-dimensional space.

As shown in FIG. 5, the menu object 32 may rotate according to the rotation of the head of the user in place of the revolution of the point 30 of view in the direction of the rotation of the head of the user. In this case, the positions of the point 30 of view and the menu object 32 may be kept. Also in this case, relatively the point 30 of view revolves in the direction of the rotation of the head of the user, with the position of the point of gaze kept. The point is that it suffices that the rotation of the menu object 32 is displayed, and the revolution of the point 30 of view and the rotation of the menu object 32 are equivalent as displaying at the time of the rotation of the head.

In the above description, the angle by which the head of the user rotates corresponds with the angle by which the point 30 of view revolves. However, the angle by which the head of the user rotates does not have to correspond with the angle by which the point 30 of view revolves. For example, the point 30 of view may revolve by the angle twice the angle by which the head of the user rotates.

Figure 6:
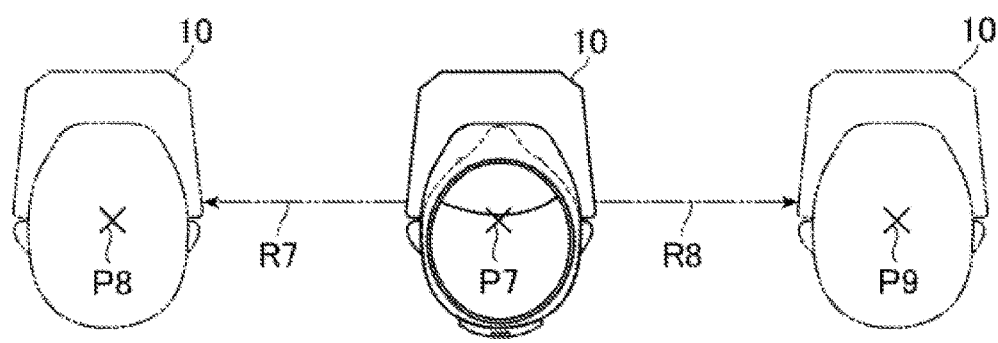
FIG. 6 is a diagram showing one example of the movement of the head.
Figure 7:
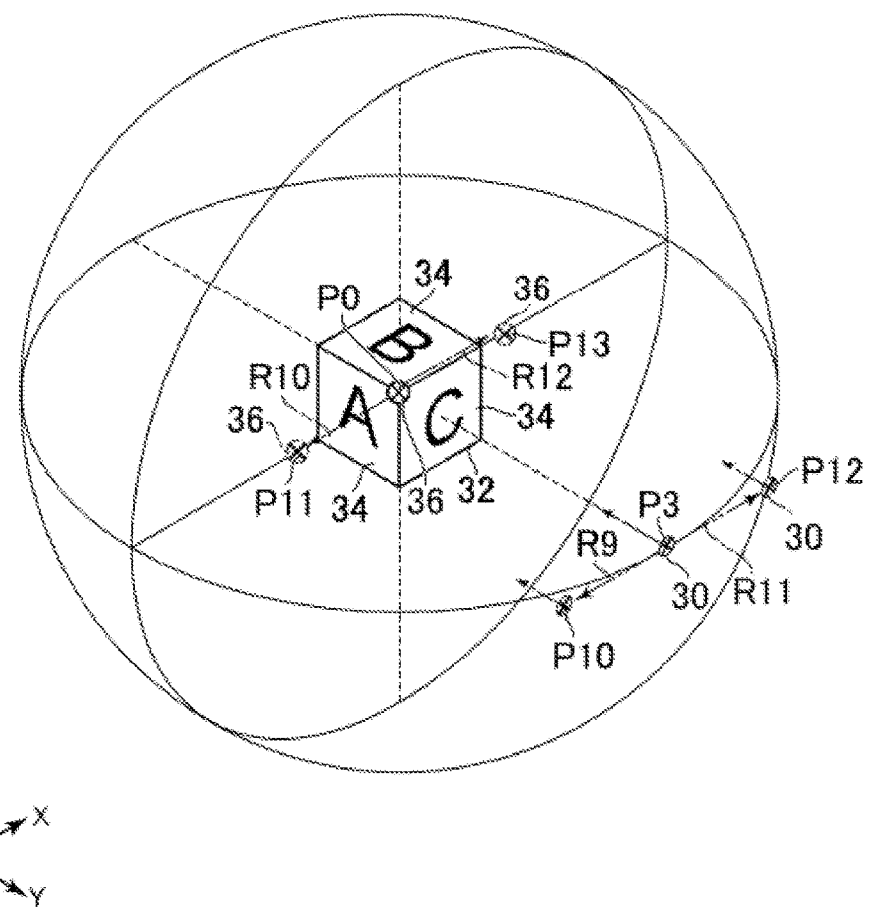
FIG. 7 is a diagram showing one example of the virtual three-dimensional space.
Figure 8:
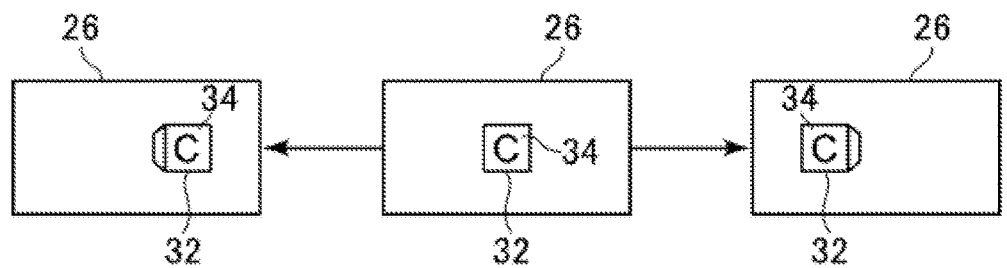
FIG. 8 is a diagram showing one example of change in displayed contents when the head moves.

In the present embodiment, when the user who wears the HMD 10 moves the head left or right, the point 30 of view and the point 36 of gaze relatively move in the direction of the movement of the head. The distance of the movement of the point 30 of view and the point 36 of gaze may be proportional to the distance of the movement of the head of the user. Furthermore, in the present embodiment, the point 36 of gaze moves in the same direction by the same distance as the point 30 of view. Here, for example, suppose that the head of the user is disposed at a position P7 in the real space as shown in FIG. 6. Furthermore, suppose that the point 30 of view is disposed at the position P3 as shown in FIG. 7 when the head of the user is disposed at the position P7. In addition, suppose that the direction of the line of sight of the point 30 of view is oriented toward the point 36 of gaze set at the position P0. Moreover, suppose that the option 34 of "C" is displayed on the display unit 26 as shown at the center of FIG. 8.

Suppose that, from the state in which the head of the user is disposed at the position P7 as shown in FIG. 6, the head of the user moves left from the position P7 to a position P8 along a route R7 for example. In this case, the point 30 of view moves left from the position P3 to a position P10 along a route R9 as shown in FIG. 7. Furthermore, the point 36 of gaze moves left from the position P0 to a position P11 along a route R10. Thereupon, as shown on the left side of FIG. 8, the menu object 32 displayed on the display unit 26 moves right.

Suppose that, from the state in which the head of the user is disposed at the position P7 as shown in FIG. 6, the head of the user moves right from the position P7 to a position P9 along a route R8 for example. In this case, the point 30 of view moves right from the position P3 to a position P12 along a route R11 as shown in FIG. 7. Furthermore, the point 36 of gaze moves right from the position P0 to a position P13 along a route R12. Thereupon, as shown on the right side of FIG. 8, the menu object 32 displayed on the display unit 26 moves left.

In the above-described manner, in the present embodiment, the user can relatively move the position of the point 30 of view left or right by moving the head left or right. Furthermore, similarly, the position of the point 30 of view may relatively move in the front-rear direction or the upward-downward direction when the user moves the head in the front-rear direction or the upward-downward direction. The position of the menu object 32 may be moved instead of moving the positions of the point 30 of view and the point 36 of gaze.

When the user moves the head upward, downward, left, or right, the HMD 10 according to the present embodiment may enter an upward-downward left-right movement mode in which the respective surfaces of the menu object 32 are displayed according to the amount of movement until the user rotates the head subsequently. In the upward-downward left-right movement mode, the displayed surface of the menu object 32 may change to the upper or lower next surface every time upward or downward movement of the head beyond a predetermined amount of movement is performed for example. Furthermore, the displayed surface of the menu object 32 may change to the left or right next surface every time leftward or rightward movement of the head beyond a predetermined amount of movement is performed for example. Then, when the user rotates the head subsequently, the HMD 10 may make transition to a rotation mode in which, in response to the rotation of the head, the point of view relatively revolves in the direction of the rotation of the head of the user, with the position of the point 36 of gaze kept.

A further description will be made below about the functions of the HMD 10 according to the present embodiment and the processing executed in the HMD 10 according to the present embodiment.

Figure 9:
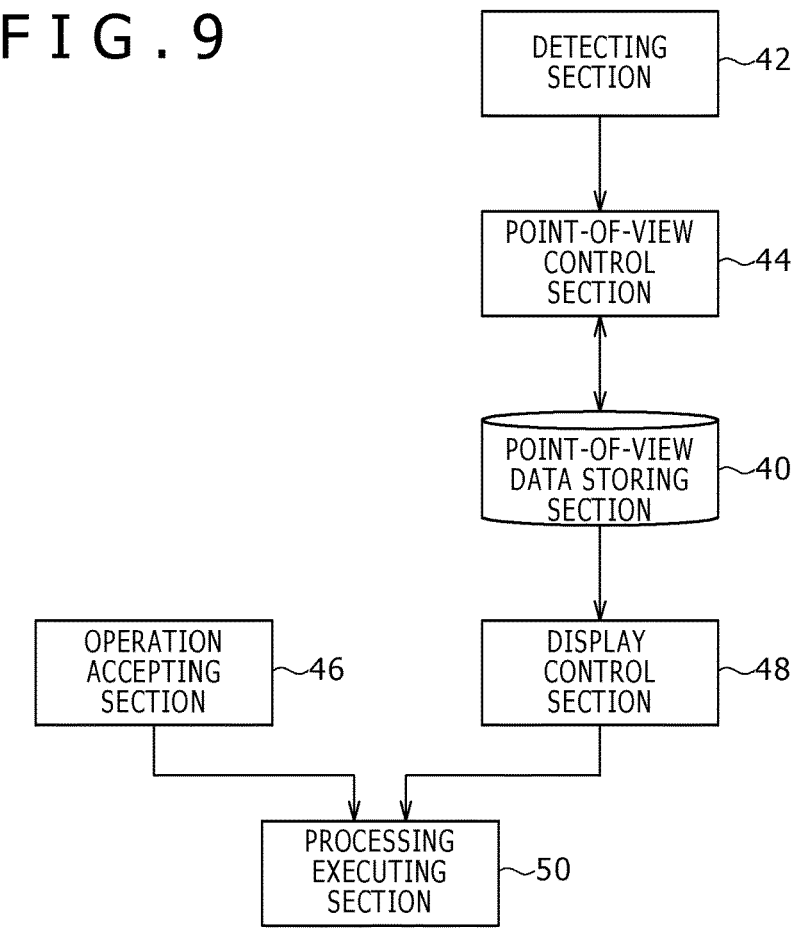
FIG. 9 is a functional block diagram showing one example of functions implemented in the head-mounted display according to one embodiment of the present disclosure.

FIG. 9 is a functional block diagram showing one example of functions implemented in the HMD 10 according to the present embodiment. In the HMD 10 according to the present embodiment, all of the functions shown in FIG. 9 do not need to be implemented and a function other than the functions shown in FIG. 9 may be implemented.

As shown in FIG. 9, the HMD 10 according to the present embodiment includes a point-of-view data storing section 40, a detecting section 42, a point-of-view control section 44, an operation accepting section 46, a display control section 48, and a processing executing section 50 in terms of functions for example. The point-of-view data storing section 40 is implemented on the basis mainly of the storing unit 22. The detecting section 42 is implemented on the basis mainly of the control unit 20 and the sensor unit 28. The point-of-view control section 44 and the processing executing section 50 are implemented on the basis mainly of the control unit 20. The operation accepting section 46 is implemented on the basis mainly of the communication unit 24. The display control section 48 is implemented on the basis mainly of the control unit 20 and the display unit 26.

The above functions are implemented by execution of a program that is installed in the HMD 10 as a computer and includes commands corresponding to the above functions by the control unit 20. This program is supplied to the HMD 10 via a computer-readable information storage medium such as an optical disk, magnetic disk, magnetic tape, magneto-optical disk, or flash memory or via the Internet or the like.

The point-of-view data storing section 40 stores data indicating the position and the direction of the line of sight of the point 30 of view. Suppose that, in the present embodiment, point-of-gaze position data indicating the coordinate value of the position of the point 36 of gaze in the virtual three-dimensional space and point-of-view vector data indicating a vector having the position of the point 36 of gaze as the start point and the position of the point 30 of view as the end point are stored in the point-of-view data storing section 40 for example. The position and the direction of the line of sight of the point 30 of view may be managed on the basis of the position of the point 36 of gaze and the vector having the position of the point 36 of gaze as the start point and the position of the point 30 of view as the end point as just described.

In the present embodiment, the detecting section 42 detects the rotation of the HMD 10 for example. Furthermore, the detecting section 42 also detects the movement of the HMD 10 in the present embodiment. In the present embodiment, the detecting section 42 detects the amount of movement and the amount of rotation of the HMD 10 at a predetermined frame rate on the basis of a measurement result output by the sensor unit 28 for example. Here, for example, the amount of movement is identified on the basis of a measurement result of an acceleration sensor and the amount of rotation is identified on the basis of a measurement result of a gyro sensor.

In the present embodiment, the point-of-view control section 44 carries out control to cause change in the position and the direction of the line of sight of the point 30 of view on the basis of the amount of movement and the amount of rotation detected by the detecting section 42 for example. In response to detection of the rotation of the HMD 10, the point-of-view control section 44 causes the point 30 of view to relatively revolve in the direction of the detected rotation, with the position of the point 36 of gaze kept, as described with reference to FIGS. 3 to 5 for example. The point-of-view control section 44 may cause the point 30 of view to revolve while the position of the point 36 of gaze and the distance between the point 30 of view and the object are kept. Furthermore, the point-of-view control section 44 may carry out control to cause the point 30 of view to relatively move in response to detection of the movement of the HMD 10 as described with reference to FIGS. 6 to 8. Specifically, the point-of-view control section 44 updates the coordinate value and the vector indicated by the point-of-gaze position data and the point-of-view vector data, respectively, stored in the point-of-view data storing section 40 on the basis of the amount of movement and the amount of rotation detected by the detecting section 42 for example.

In the present embodiment, for example, in response to operation by a user to the controller 12, the operation accepting section 46 accepts an operation signal associated with this operation from the controller 12.

In the present embodiment, for example, in response to detection of rotation by the detecting section 42, the display control section 48 carries out control to cause the display unit 26 to display an image representing appearance obtained when the object is viewed from the point 30 of view that has relatively revolved in the direction of the detected rotation while the position of the point 36 of gaze is kept. In the present embodiment, an image representing appearance obtained when the menu object 32 is viewed from the point 30 of view whose position and direction of the line of sight have been controlled by the point-of-view control section 44 is displayed on the display unit 26 for example.

In the present embodiment, for example, the processing executing section 50 executes processing according to the option disposed on the surface of the object displayed on the display unit 26 in response to acceptance of selection operation as described above.

Figure 10:
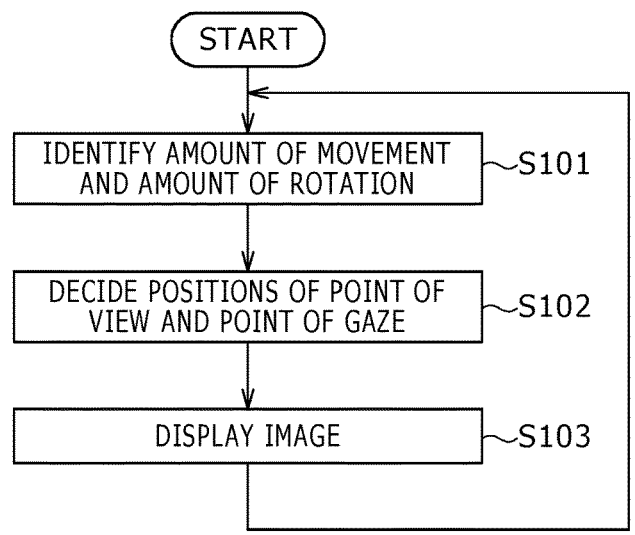
FIG. 10 is a diagram showing one example of the flow of processing executed in the head-mounted display according to one embodiment of the present disclosure.

One example of the flow of display control processing executed in the HMD 10 according to the present embodiment at a predetermined frame rate will be described with reference to a flow diagram exemplified in FIG. 10. Suppose that the menu object 32 is disposed in a virtual three-dimensional space in the processing example shown in FIG. 10.

First, the detecting section 42 identifies the amount of movement and the amount of rotation of the HMD 10 in the period from the immediately-previous frame to the relevant frame (S101).

Then, the point-of-view control section 44 decides the positions of the point 30 of view and the point 36 of gaze in the relevant frame on the basis of the amount of movement and the amount of rotation identified in the processing shown in S101 (S102).

In the processing shown in S102, the coordinate value and the vector indicated by the point-of-gaze position data and the point-of-view vector data, respectively, stored in the point-of-view data storing section 40 are updated for example. Specifically, for example, the coordinate value indicated by the point-of-gaze position data stored in the point-of-view data storing section 40 is updated to a value obtained by adding, to this coordinate value, a value obtained by multiplying the value of the amount of movement identified in the processing shown in S101 by a predetermined coefficient. Furthermore, the vector indicated by the point-of-view vector data stored in the point-of-view data storing section 40 is updated to a vector in a direction resulting from rotation of the vector indicated by the point-of-view vector data around the start point according to the amount of rotation identified in the processing shown in S101. The angle by which the vector indicated by the point-of-view vector data is rotated may be an angle obtained by multiplying the angle represented by the amount of rotation identified in the processing shown in S101 by a predetermined factor for example.

Then, the display control section 48 causes the display unit 26 to display an image representing appearance obtained when a look is taken from the position of the point 30 of view decided in the processing shown in S102 toward the position of the point 36 of gaze decided in the processing shown in S102 (S103). In this processing example, the coordinate value of the position of the point 36 of gaze in the relevant frame is equivalent to the coordinate value indicated by the point-of-gaze position data resulting from the update by the processing shown in S102. Furthermore, the coordinate value of the position of the point 30 of view in the relevant frame is equivalent to the coordinate value of the position resulting from movement of the position indicated by the point-of-gaze position data resulting from the update by the processing shown in S102 by the vector indicated by the point-of-view vector data resulting from the update in the processing shown in S102.

In this processing example, the processing shown in S101 to S103 is repeatedly executed at a predetermined frame rate as described above. In this manner, in the present embodiment, the image displayed on the display unit 26 is updated at the predetermined frame rate in such a manner as to follow the rotation and movement of the head.

In the present embodiment, when the point 30 of view moves forward or rearward, the object disposed in the virtual three-dimensional space may change according to change in the distance between the point 30 of view resulting from the movement and the object disposed in the virtual three-dimensional space. A description will be made below about change in the object disposed in the virtual three-dimensional space according to change in the distance between the point 30 of view and this object.

Figure 11:
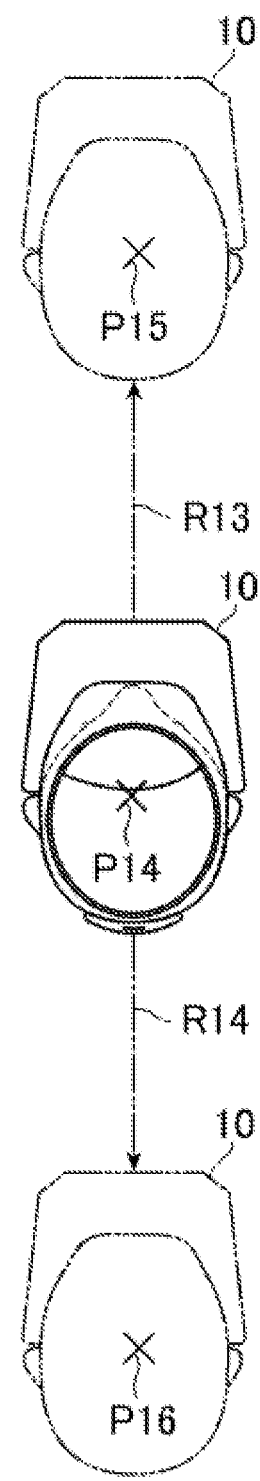
FIG. 11 is a diagram showing one example of the movement of the head.
Figure 12:
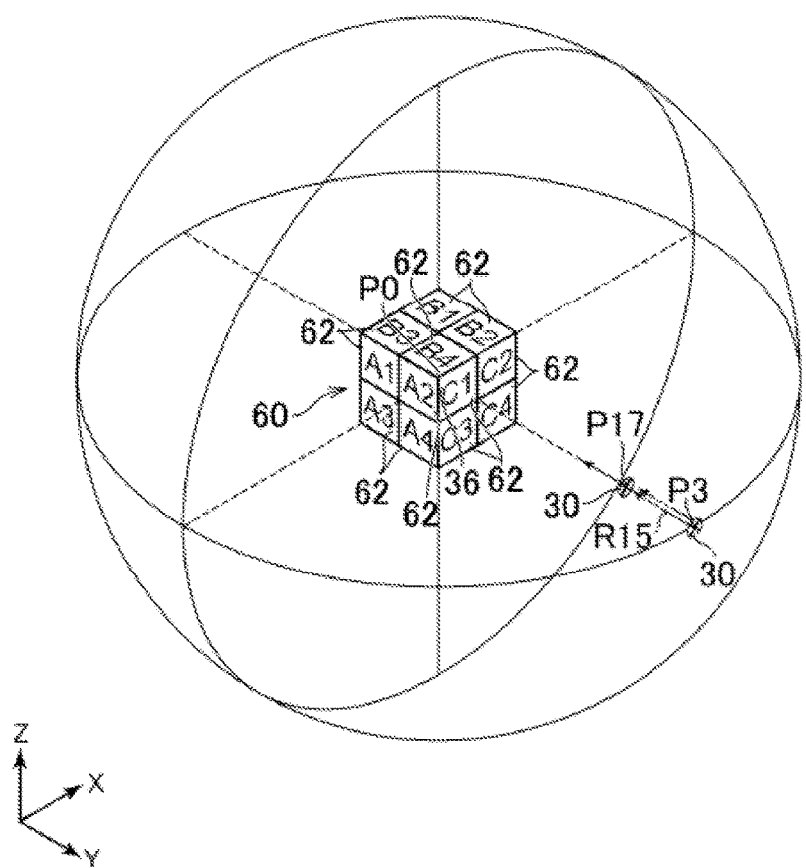
FIG. 12 is a diagram showing one example of the virtual three-dimensional space.
Figure 13:
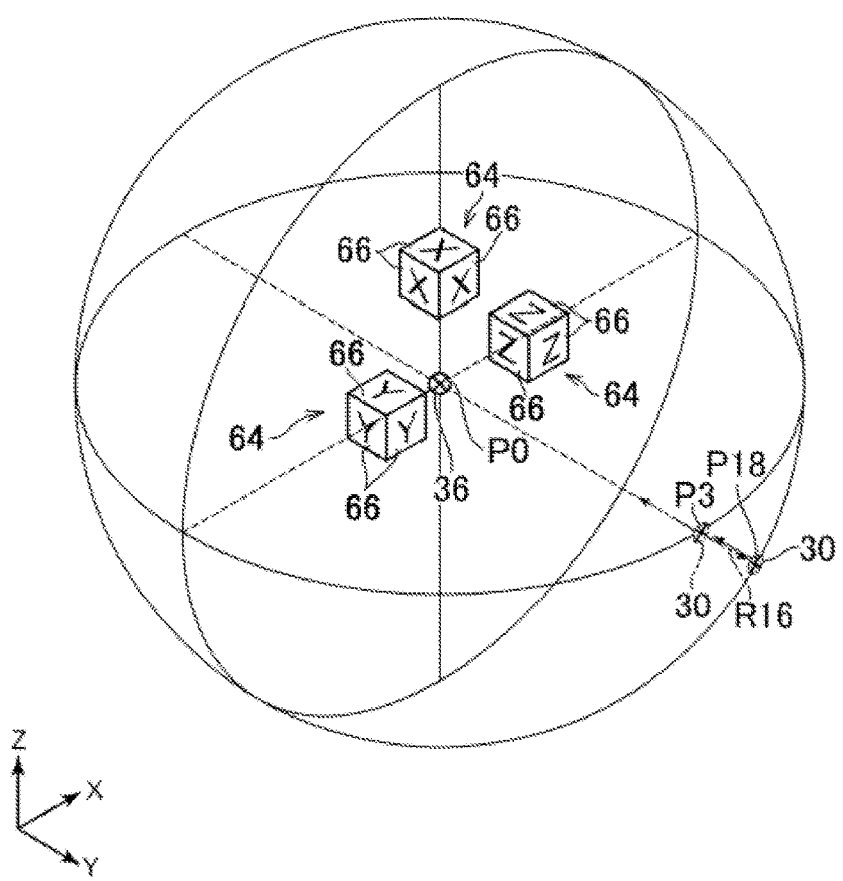
FIG. 13 is a diagram showing one example of the virtual three-dimensional space.
Figure 14:
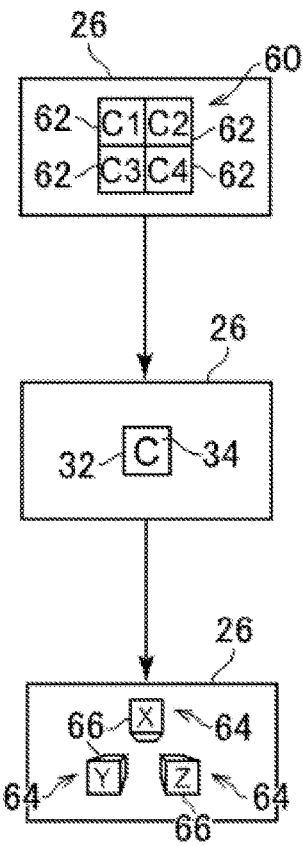
FIG. 14 is a diagram showing one example of change in displayed contents when the head moves.

Here, for example, suppose that the head of a user is disposed at a position P14 in the real space as shown in FIG. 11. Furthermore, suppose that the point 30 of view is disposed at the position P3 as shown in FIGS. 12 and 13 when the head of the user is disposed at the position P14. Moreover, the direction of the line of sight of the point 30 of view is oriented toward the point 36 of gaze set at the position P0. In addition, suppose that the option 34 of "C" is displayed on the display unit 26 as shown at the center of FIG. 14.

Suppose that, from the state in which the head of the user is disposed at the position P14 as shown in FIG. 11, the head of the user moves forward from the position P14 to a position P15 along a route R13 for example. In this case, the point 30 of view moves forward from the position P3 to a position P17 along a route R15 as shown in FIG. 12. Then, the menu object 32 disposed in the virtual three-dimensional space changes to a menu object 60 shown in FIG. 12. This leads to displaying of the menu object 60 on the display unit 26 as shown on the upper side of FIG. 14.

The menu object 60 shown in FIG. 12 is a hexahedron as with the menu object 32, and four options 62 are disposed on each surface. Furthermore, the surfaces of the menu object 60 are each associated with any surface of the menu object 32. The surface of the menu object 60 and the surface of the menu object 32 associated with each other are oriented in the same direction. For example, the surface of the menu object 60 on which the options 62 of "A1" to "A4" are disposed is associated with the surface of the menu object 32 on which the option 34 of "A" is disposed. Furthermore, the surface of the menu object 60 on which the options 62 of "A1" to "A4" are disposed and the surface of the menu object 32 on which the option 34 of "A" is disposed are oriented in the same direction. In the present embodiment, the options 62 disposed on the menu object 60 are subcategories of the option 34 of the corresponding surface in the menu object 32 for example. Furthermore, in response to operation of selecting any of the displayed options 62, processing according to the selected option 62 is executed.

Suppose that, from the state in which the head of the user is disposed at the position P14 as shown in FIG. 11, the head of the user moves rearward from the position P14 to a position P16 along a route R14 for example. In this case, the point 30 of view moves rearward from the position P3 to a position P18 along a route R16 as shown in FIG. 13. Then, the menu object 32 disposed in the virtual three-dimensional space changes to three menu objects 64 shown in FIG. 13. This leads to displaying of the menu objects 64 on the display unit 26 as shown on the lower side of FIG. 14. As just described, the number of objects disposed in the virtual three-dimensional space may change according to change in the distance between the point 30 of view after movement and the object disposed in the virtual three-dimensional space.

The three menu objects 64 shown in FIG. 13 are each a hexahedron. An option 66 is disposed on each surface of the menu objects 64. In the present embodiment, the options 66 disposed on the surfaces of the menu objects 64 are higher-level categories of the option 34 disposed on the corresponding surface of the menu object 32 for example. Furthermore, in response to operation of selecting any of the displayed menu objects 64, processing according to the option 66 disposed on the selected menu object 64 is executed.

The above configuration enables the user to change the displayed object and the selectable options by moving the head forward or rearward.

The range in which the point 30 of view can move may be limited. Specifically, the distance between the point 30 of view and the menu object 32 may be limited to a predetermined range for example.

A further description will be made below with reference to FIG. 15 about one example of change of the menu object 32 according to the distance between the point 30 of view and the menu object 32 and the limitation of the range in which the point 30 of view can move.

The following description is based on the assumption that the distance between the point 30 of view and the menu object 32 in the initial state is d0. In the present embodiment, the distance between the point 30 of view and the menu object 32 refers to the distance between the position of the point 30 of view and the position of a representative point of the menu object 32, specifically e.g. the distance between the position of the point 30 of view and the position of the center of the menu object 32.

Figure 15:
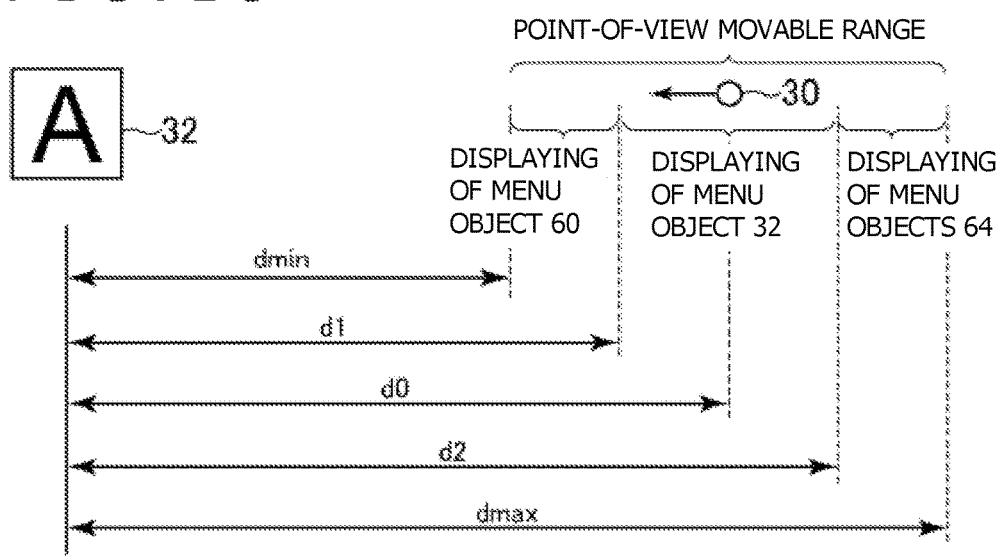
FIG. 15 is an explanatory diagram for explaining one example of change of a menu object according to the distance between the point of view and the menu object and limitation of the range in which the point of view can move.

Here, for example, the range in which the point 30 of view can move may be limited to a point-of-view movable range exemplified in FIG. 15, in which the distance between the point 30 of view and the menu object 32 is at least dmin and at most dmax (here, dmin<d0<dmax). That is, the distance between the point 30 of view and the menu object 32 may be controlled not to become shorter than dmin and not to become longer than dmax.

As shown in FIG. 15, the ranges of the distance in which the menu object 32 changes to the menu object 60 or the menu objects 64 may be set in the present embodiment. In the example of FIG. 15, if the distance between the point 30 of view and the menu object 32 is at least dmin and at most d1, the menu object 32 changes to the menu object 60 and the menu object 60 is displayed (here, dmin<d1<d0). If the distance between the point 30 of view and the menu object 32 is at least d2 and at most dmax, the menu object 32 changes to the menu objects 64 and the menu objects 64 are displayed (here, d0<d2<dmax). If the distance between the point 30 of view and the menu object 32 is longer than d1 and shorter than d2, the menu object 32 is displayed.

In the present embodiment, when the posture of the HMD 10 becomes the posture of the initial state, the position and the direction of the line of sight of the point 30 of view may become the initial state and the menu object 32 may be displayed.

Displayed contents may be gradually changed to display appearance obtained when the object disposed in the virtual three-dimensional space is viewed from a base relative position, specifically e.g. a relative position in the initial state. For example, when the point 30 of view revolves, the menu object 32 may gradually rotate into the orientation with which the option 34 of "A" is visible in such a manner as to follow the revolution of the point 30 of view.

Figure 16:
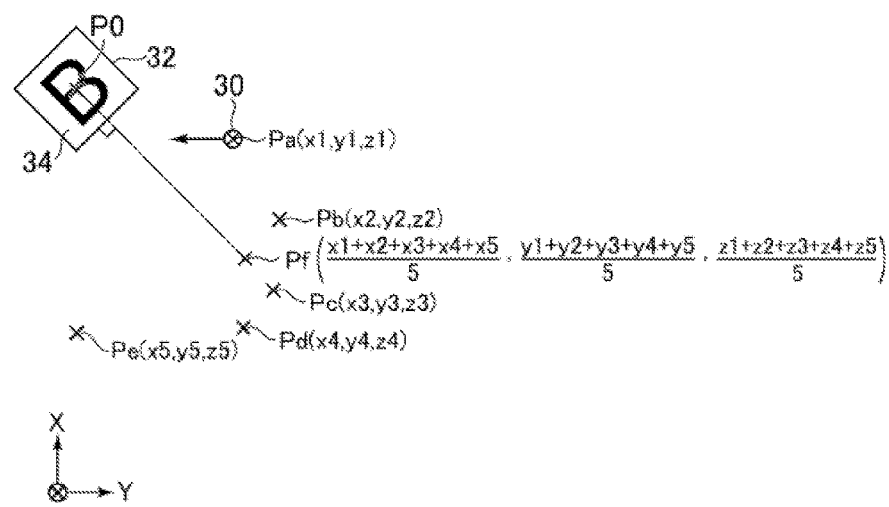
FIG. 16 is an explanatory diagram for explaining one example of the rotation of the menu object.

One example of processing of the gradual rotation of the menu object 32 will be described with reference to FIG. 16. FIG. 16 is a diagram showing appearance obtained when the virtual three-dimensional space shown in FIG. 3 is viewed from above, i.e. viewed along the Z-axis negative direction. In the example shown in FIG. 16, the orientation of the menu object 32 is decided on the basis of the moving average of the position coordinates of the point 30 of view. Here, for example, suppose that the position of the point 30 of view identified in a certain frame is Pa (x1, y1, z1) as shown in FIG. 16. Furthermore, suppose that the position of the point 30 of view identified in the frame immediately previous to the relevant frame is Pb (x2, y2, z2). Similarly, suppose that the positions of the point 30 of view identified in the frames previous to the relevant frame by two frames, by three frames, and by four frames are Pc (x3, y3, z3), Pd (x4, y4, z4), and Pe (x5, y5, z5), respectively. The average of the coordinates of the position Pa, the position Pb, the position Pc, the position Pd, and the position Pe is identified as the coordinates of a position Pf serving as the basis of the orientation of the menu object 32. Here, the position Pf ((x1+x2+x3+x4+x5)/5, (y1+y2+y3+y4+y5)/5, (z1+z2+z3+z4+z5)/5) is identified for example. Furthermore, for example, the menu object 32 rotates so that the surface on which the option 34 of "A" is disposed as the base surface of the menu object 32 may become perpendicular to a line segment linking the position Pf and the position P0 of the point 36 of gaze, which is also the position of the center of the menu object 32.

This allows the user to rotate the menu object 32 by rotating the HMD 10. Furthermore, movement of the menu object 32 according to movement of the HMD 10 in a similar manner may be allowed.

The processing of the gradual rotation of the menu object 32 is not limited to the above-described processing. For example, the orientation of the menu object 32 does not need to be decided on the basis of the moving average of the position coordinates of the point 30 of view. Furthermore, for example, a position on a circle centered at the position P0 of the point 36 of gaze may be identified as the position Pf.

Furthermore, e.g. a configuration may be employed in which the displayed image does not change even when the HMD 10 rotates or moves during a period when the user is carrying out limitation operation such as operation of pressing down a predetermined button. This allows the user to rotate and move the head without changing the displayed contents. Therefore, for example, when taking a hard posture, the user can return the posture to a natural posture without changing the displayed contents.

Moreover, for example, when the user carries out reset operation such as operation of pressing down a predetermined button, the displayed contents may change to a state in which appearance obtained when the object is viewed from the base relative position is displayed, such as the above-described initial state.

The point-of-view control section 44 shown in FIG. 9 may carry out the change of the menu object described with reference to FIGS. 11 to 15 and the rotation of the menu object described with reference to FIG. 16. Furthermore, the point-of-view control section 44 may carry out control to limit the distance between the point 30 of view and the object within the predetermined point-of-view movable range as described with reference to FIG. 15.

Furthermore, during a period when limitation operation is received, the display control section 48 may limit change in the image displayed on the display unit 26 irrespective of whether rotation is detected by the detecting section 42.

What are described above can be applied to both the case in which two-dimensional images are displayed on the display unit 26 and the case in which three-dimensional images are displayed on the display unit 26. In the case in which three-dimensional images are displayed, the above-described processing is executed about each of the point 30 of view associated with an image for the left eye and the point 30 of view associated with an image for the right eye.

The present disclosure is not limited to the above-described embodiment.

For example, an embodiment of the present disclosure may be applied to a device other than the HMD 10. For example, an embodiment of the present disclosure may be applied to a computer such as a portable game device held by a user, with a display disposed in front of the eyes of the user. Furthermore, an embodiment of the present disclosure may be applied to a portable computer that is fitted to a casing worn by a user so as to cause a display to be disposed in front of the eyes of the user. Moreover, for example, an information processing device that can communicate with the HMD 10, such as an entertainment device, may carry out the above-described control. For example, an information processing device that can communicate with the HMD 10 may carry out control to cause the display unit 26 to display an image representing appearance obtained when an object is viewed from the point of view that has relatively revolved in the direction of detected rotation while the position of the point of gaze is kept in response to detection of the rotation of the HMD 10.

The present disclosure contains subject matter related to that disclosed in Japanese Priority Patent Application JP 2015-112591 filed in the Japan Patent Office on Jun. 2, 2015, the entire content of which is hereby incorporated by reference.

What is claimed is:

1. A head-mounted display that displays an image representing appearance obtained when a menu object is viewed from a point of view disposed in a virtual three-dimensional space, the head-mounted display comprising:
a detecting section configured to detect rotation of the head-mounted display, x-axis movement of the head-mounted display, and z-axis movement of the head-mounted display,
wherein each side of the menu object displays a different menu option selectable by a user of the head-mounted; and
a display control section configured to cause:
(a) in response to detected rotation of the head-mounted display, the menu object to rotate at a fixed position in the virtual three-dimensional space while a position and a location of the point of view is unchanged in response to the detected rotation by the detecting section, and
(b) in response to detected x-axis movement of the head-mounted display, a corresponding x-axis movement of the position of the point of view; and
(c) in response to detected z-axis movement, a corresponding z-axis movement in z-distance to the menu object,
wherein a movable range of the z-distance is limited to a minimum z-distance, z-min, and a maximum z-distance, z-max.

2. The head-mounted display according to claim 1, wherein a first menu option is displayed on a first side of the menu object when z-max≥z-distance≥z1, and
wherein a first subset of menu options related to the first menu option are displayed on the first side of the menu object when z1>z-distance≥z-min.

3. The head-mounted display according to claim 1, wherein a plurality of other menu objects are displayed in addition to the menu object when z-max≥z-distance≥z3.

4. A non-transitory computer readable medium having stored thereon a program for a computer which displays an image representing appearance obtained when a menu object disposed in a virtual three-dimensional space is viewed from a point of view disposed in the virtual three-dimensional space, the program comprising:
a detecting section configured to detect rotation of the head-mounted display, x-axis movement of the head-mounted display, and z-axis movement of the head-mounted display,
wherein each side of the menu object displays a different menu option selectable by a user of the head-mounted; and
a display control section configured to cause:
(a) in response to detected rotation of the head-mounted display, the menu object to rotate at a fixed position in the virtual three-dimensional space while a position and a location of the point of view is unchanged in response to the detected rotation by the detecting section, and
(b) in response to detected x-axis movement of the head-mounted display, a corresponding x-axis movement of the position of the point of view; and
(c) in response to detected z-axis movement, a corresponding z-axis movement in z-distance to the menu object,
wherein a movable range of the z-distance is limited to a minimum z-distance, z-min, and a maximum z-distance, z-max.

* * * * *